United States Patent
van Wageningen et al.

(10) Patent No.: US 11,575,282 B2
(45) Date of Patent: Feb. 7, 2023

(54) WIRELESS POWER TRANSFER

(71) Applicant: KONINKLIJKE PHILIPS N.V., Eindhoven (NL)

(72) Inventors: Andries van Wageningen, Wijlre (NL); Antonius Adriaan Maria Staring, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/443,346

(22) Filed: Jul. 26, 2021

(65) Prior Publication Data

US 2021/0351633 A1    Nov. 11, 2021

Related U.S. Application Data

(63) Continuation of application No. 16/629,749, filed as application No. PCT/EP2018/069170 on Jul. 13, 2018, now Pat. No. 11,095,168.

(30) Foreign Application Priority Data

Jul. 13, 2017 (EP) .................................... 17181280

(51) Int. Cl.
*H02J 50/80* (2016.01)
*H02J 50/10* (2016.01)
(Continued)

(52) U.S. Cl.
CPC .............. *H02J 50/80* (2016.02); *H02J 50/10* (2016.02); *H02J 50/40* (2016.02); *H04B 5/0037* (2013.01)

(58) Field of Classification Search
None
See application file for complete search history.

(56) References Cited

U.S. PATENT DOCUMENTS

| 8,115,448 B2 | 2/2012 | John |
| 9,385,788 B2 | 7/2016 | Akazawa |

(Continued)

FOREIGN PATENT DOCUMENTS

JP    2017093234 A    5/2017

OTHER PUBLICATIONS

"An introduction to the Wireless Power Consortium.." from Texas Instruments Incorporated 2011.
(Continued)

*Primary Examiner* — Adi Amrany

(57) ABSTRACT

A wireless power transfer system comprises at least one power receiver (105) for receiving a power transfer from the power transmitter (101) via a wireless inductive power transfer signal. Configurers (207, 306) of the power transmitter and receiver may perform a configuration process to determine a set of power transfer parameter values which are used in a first power transfer. The power transfer parameter values and a first identity for the first power receiver (105) are stored. After a detection of an absence of the power receiver by a first controller (211), a detector (213) may detect a presence of a candidate power receiver. If the candidate power receiver is detected within a given duration and has an identity matching the first identity, an initialization processor (215) initializes a second power transfer using the set of stored parameter values. Otherwise it discards the set of stored parameter values.

20 Claims, 3 Drawing Sheets

(51) Int. Cl.
*H02J 50/40* (2016.01)
*H04B 5/00* (2006.01)

(56) References Cited

U.S. PATENT DOCUMENTS

| | | |
|---|---|---|
| 9,617,895 B2 | 4/2017 | Mueller-Haas et al. |
| 9,735,836 B2 | 8/2017 | Van Wageningen |
| 10,855,109 B2 | 12/2020 | Van Wageningen et al. |
| 2010/0026236 A1 | 2/2010 | Kimiyama et al. |
| 2012/0300588 A1* | 11/2012 | Perry ............ H02J 50/40 367/135 |
| 2013/0300358 A1 | 11/2013 | Kirby |
| 2015/0155918 A1* | 6/2015 | Van Wageningen ............ H04B 5/0031 307/104 |
| 2015/0249339 A1 | 9/2015 | Van Wageningen et al. |
| 2016/0118811 A1 | 4/2016 | Eguchi |
| 2016/0156232 A1 | 6/2016 | Joye |
| 2016/0190870 A1* | 6/2016 | Nagamine ......... H02J 50/402 307/52 |
| 2017/0061142 A1 | 3/2017 | Niessen |
| 2017/0237296 A1 | 8/2017 | Rex et al. |
| 2017/0279305 A1* | 9/2017 | Staring ............ H02J 50/10 |

OTHER PUBLICATIONS

International Search Report From PCT/EP2018/069170 dated Oct. 15, 2018.

* cited by examiner

WIRELESS POWER TRANSFER

CROSS-REFERENCE TO PRIOR APPLICATIONS

This application is a continuation of U.S. patent application Ser. No. 16/629,749 which is the U.S. National Phase application under 35 U.S.C. § 371 of International Application No. PCT/EP2018/069170, filed on Jul. 13, 2018, which claims the benefit of EP Patent Application No. EP 17181280.3, filed on Jul. 13, 2017. These applications are hereby incorporated by reference herein.

FIELD OF THE INVENTION

The invention relates to inductive power transfer and in particular, but not exclusively, to a power transmitter providing inductive power transfer using elements compatible with the Qi Specifications for wireless power transfer systems.

BACKGROUND OF THE INVENTION

Most present day systems require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor and a secondary receiver coil. By separating the primary transmitter inductor and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter inductor in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specifications has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

The continued development of wireless power transfer specifications and procedures is attracting significant resource and research interest. For example, the Wireless Power Consortium is developing a specification for cordless power transfer to higher power applications, such as to support kitchen appliances. In this approach, a cordless appliance being placed on a power transmitter leads to a negotiation procedure being started to determine a power transfer contract. This contract depends on the expected power demand of the appliance and the capability of the power transmitter to deliver power. The contract includes, e.g., a specification of the amount of power that a cordless appliance is allowed to draw from the power transmitter. The negotiation may establish a minimum value for this power such that it can be ensured that sufficient power for correct operation of the appliance will be available. The appliance may e.g. need to be able to draw at least 1000 W of power to guarantee good heating of the food in a pan.

However, whereas the approach may provide very efficient and reliable operation in many scenarios, it may also in some situations be suboptimal and may have associated disadvantages. Specifically, the process of negotiation and establishing of power contract tends to be relatively complex and slow. Also, the process of establishing a safe communication link typically takes considerable time (e.g. due to NFC communication initialization). These features tend to introduce a significant delay in initializing a power transfer and tends to reduce the user experience for some applications.

Hence, an improved power transfer approach would be advantageous. In particular, an approach that allows improved operation, improved power transfer, increased flexibility, facilitated implementation, facilitated operation, improved power transfer, improved user experience and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided power transmitter for a wireless power transfer system including at least one power receiver for receiving a power transfer from the power transmitter via a wireless inductive power transfer signal; the power transmitter comprising: a communicator for communicating messages with power receivers; a configurer for performing a configuration phase during power transfer initialization of a first power transfer with a first power receiver, the configurer being arranged to perform a configuration process during the configuration phase to determine a set of power transfer parameter values for the first power transfer in response to a communication with the first power receiver; a store for storing the set of power transfer parameter values and a first identity indication for the first power receiver; a power transfer controller for performing the first power transfer during a power transfer phase using the set of power transfer parameter values; a first controller for entering the power transmitter into a standby phase in response to a detection of an absence of the power receiver during the power transfer phase; a maximum power level for the power transfer signal during the standby phase being lower than a maximum power level for the power transfer signal during the power transfer phase; a detector for determining a presence of a candidate power receiver during the standby phase; a duration comparator for determining if a first duration from the detection of the absence of the first power receiver to the detection of the presence of the candidate power receiver exceeds a first threshold; an indication comparator for determining if a candidate identity indication being an indication of an identity of the candidate power receiver matches the first identity indication; and an initialization processor arranged to initialize a second power transfer with the candidate power receiver using the set of stored parameter values subject to the duration being below the threshold and the candidate identity indication matching the first identity indication; and to discard the set of stored parameter values if the candidate identity indication does not match the first identity indication or if the duration since exceeds the threshold.

The invention may provide an improved user experience and/or improved performance in many scenarios and applications. The approach may in particular in many systems and scenarios allow more user flexibility and may more effectively support e.g. user's flexibly moving and repositioning power receivers. It may in particular provide a faster power transfer initialization in many scenarios while still preserving reliability and ensuring safe operation. The approach may allow faster initialization of power transfers in some scenarios while still preserving full flexibility and freedom in setting up new power transfers.

The approach may be particularly advantageous for applications such as kitchen applications in which e.g. kitchen appliances may be wirelessly powered. It may allow such kitchen appliances to by dynamically lifted or e.g. moved to other power transmitters while minimizing the impact on the power provision. For example, it may provide effective support of e.g. a user lifting a wirelessly powered pan to shake or stir food after which it is repositioned on the power transmitter. The approach may allow improved support of wirelessly powered kitchen appliances and in particular may allow a user experience that is closer to that known from conventional hubs.

The maximum power level for the power transfer signal during the standby phase may in many cases correspond to no power transfer signal being generated, i.e. the maximum power level may typically be substantially zero (at least for the majority of the time).

The use of the set of stored parameter values may be subject to other requirements than the duration being below a threshold and the identities matching. For example, it may be subject to the power receiver having previously indicated that it supports initialization of a power transfer based on stored parameters. It will also be appreciated that the set of stored parameters may in some embodiments additionally be discarded in response to other criteria. For example, the set of stored values may be discarded in response to a user input.

The power transmitter may be arranged to not perform the same configuration procedure when power transfer is initialized using the set of stored parameters as when the set of stored parameters is not used, i.e. the configuration process may be different for the first power transfer and for the second power transfer initialization. In some embodiments, a reduced configuration process may be performed when a power transfer operation is initialized using the set of stored parameters. The reduced configuration process may be a subset of the configuration process performed when the set of stored parameters is not used (i.e. for the first power transfer), and specifically may omit determination of at least one parameter value.

The set of stored parameter values may include a value for an allowable power extraction limit being a maximum power level for the power transfer signal guaranteed to be supported by the power transmitter during a power transfer operation.

In accordance with an optional feature of the invention, the configurer is arranged to communicate with the first power receiver to determine whether the first power receiver supports initialization of a power transfer based on stored power transfer parameter values; and the initialization processor is arranged to initialize the second power transfer only if the first power receiver has indicated that it supports initialization of power transfer based on stored power transfer parameter values.

The approach may allow a differentiated and adaptable approach and may specifically allow the operation to be targeted to the preferences and requirements of the individual power receiver. For example, the same power transmitter may adapt the operation to the individual device or appliance that is being powered, and may for example prevent that unsafe or undesired effects occur for some appliances that are not suited for fast power transfer initialization based on parameters from a previous power transfer.

In accordance with an optional feature of the invention, the communicator is arranged to receive a time indication from the first power receiver, and the duration comparator is arranged to determine the first threshold in response to the time indication. This may provide improved performance in many scenarios and may allow the power receiver to control the operation of the power transmitter, and specifically it may control when it is allowed to perform a power transfer initialization based on stored parameter values. It may allow the operation to be adapted to the specific requirements and preferences of the individual wirelessly powered appliance or device.

The time indication may be transmitted to the power transmitter from the first power receiver during the configuration process.

In accordance with an optional feature of the invention, the power transmitter further comprises a resource controller arranged to reserve a resource for the first power transfer from a shared resource being shared between a plurality of power transmitters; the resource controller being arranged to retain a reserved resource for the first power transfer until a second duration since the detection of the absence of the first power receiver exceeds a second threshold.

This may provide a particularly efficient operation in many practical scenarios and applications. The shared resource may be a shared power resource. The first threshold and the second threshold may be the same in many embodiments.

For example, it may provide the advantage that there is no need to wait for resource to become available at a later point in time when the first power transfer can be "restarted".

In accordance with an optional feature of the invention, the indication comparator is arranged to transmit at least one message to the candidate power receiver comprising the first identity indication; and to determine if the candidate identity indication matches the first identity indication in response to whether an expected response message is received from the candidate power receiver.

This may provide an efficient operation in many embodiments. The use of the first identity indication may be as an address of an intended message destination. For example, the last one message may be addressed to the first power receiver by the message including the first identity indication. The first identity indication may specifically be the identity of the first power receiver. The expected response message may for example be an acknowledge message or a message that would only be received from the candidate power receiver if this indeed has the same identity as the first power receiver, i.e. if they are the same power receiver.

The approach may in particular provide efficient operation in embodiments using a communication scheme in which transmitted messages are addressed to specific destinations.

The indication comparator may be arranged to transmit at least one message to the candidate power receiver comprising the first identity indication as part of the initialization of the second power transfer, and typically during the standby phase/prior to the second power transfer.

In accordance with an optional feature of the invention, the initialization processor is arranged to transmit indications of at least one parameter value of the set of stored parameter values to the candidate power receiver when initializing the second power transfer with the candidate power receiver.

This may provide an efficient operation in many embodiments. It may in particular allow facilitated storage in order to support the operation. An advantage in many embodiments is that the approach may obviate the need for the power receiver to comprise non-volatile storage for storing power transfer parameters during times when no wireless power is provided.

The power transmitter may transmit the stored parameter values that are relevant, necessary, and/or desired for the power receiver to initialize the power transfer without performing the configuration process to establish them.

In accordance with an optional feature of the invention, the communicator is arranged to transmit a power transfer termination indication to the candidate power receiver, the power transfer termination indication indicating that the first power transfer has terminated.

This may provide improved operation in many embodiments.

In some embodiments, the initialization processor may be arranged to limit a power level of the power transfer signal until a power on request is received from the candidate power receiver.

This may provide improved operation in many embodiments. The power level may be limited to substantially zero, i.e. the power transfer signal may not be switched on until requested by the power receiver.

In accordance with an optional feature of the invention, the initialization processor is arranged to initialize the second power transfer with a power level of the power transfer signal determined in response to at least one parameter value of the stored set of power transfer parameter values.

This may provide improved operation in many embodiments. In particular, it may in many scenarios allow a faster return to a nominal operation with the power transfer signal providing sufficient power to the power receiver.

In accordance with an optional feature of the invention, the initialization processor is arranged to initialize the second power transfer with a power level of the power transfer signal at a nominal level independent of the stored set of power transfer parameter values.

This may provide improved operation in many embodiments. In particular, it may in many scenarios allow a more reliable and/or less risky power transfer restart that may take into account changed conditions, such as changes in the coupling between the transmitter power coil and the receive power coil due to a change in the relative position of the power transmitter and power receiver.

In accordance with an optional feature of the invention, the power transmitter further comprises a receiver for receiving a time indication, a second set of power transfer parameter values and a second identity indication for a second power receiver; and wherein the initialization processor is arranged to initialize a power transfer with the candidate power receiver using the second set of stored parameter values subject to a duration from a time indicated by the time indication and a time of the detection of the presence of the candidate power receiver being below a threshold, and the candidate identity indication matching the second identity indication.

This may in many embodiments allow a more flexible operation and provide enhanced functionality. For example, it may allow multiple power transmitters to interwork to support a power receiver. E.g. it may allow a faster power transfer initialization in situations wherein a wirelessly powered appliance is moved from one power transmitter to another.

According to an aspect of the invention there is provided a power receiver for a wireless power transfer system including a power transmitter for providing a power transfer to the power receiver via a wireless inductive power transfer signal; the power receiver comprising: a communicator for communicating messages with power transmitters; a power extractor for extracting power from the power transfer signal during a power transfer phase; a configurer for performing a configuration phase during power transfer initialization of a first power transfer with the power transmitter, the configurer being arranged to perform a configuration process during the configuration phase to determine a set of power transfer parameter values for the first power transfer in response to a communication with the power transmitter; a power transfer controller arranged detect a termination of the first power transfer; and wherein the communicator is arranged to receive power transfer parameter values from the power transmitter; and the power transfer controller is arranged to initialize a second power transfer using the received power transfer parameter values.

The invention may provide an improved user experience and/or improved performance in many scenarios and applications. The approach may in particular in many systems and scenarios allow more user flexibility and may more effectively support e.g. user's flexibly moving and repositioning power receivers. It may in particular provide a faster power transfer initialization in many scenarios while still preserving reliability and ensuring safe operation. The approach may allow faster initialization of power transfers in some scenarios while still preserving full flexibility and freedom in setting up new power transfers.

The approach may be particularly advantageous for applications such as kitchen applications in which e.g. kitchen appliances may be wirelessly powered. It may allow such kitchen appliances to by dynamically lifted or e.g. moved to other power transmitters while minimizing the impact on the power provision. For example, it may provide effective support of e.g. a user lifting a wirelessly powered pan to shake or stir food after which it is repositioned on the power transmitter. The approach may allow improved support of wirelessly powered kitchen appliances and in particular may allow a user experience that is closer to that known from conventional hubs.

The power receiver may be arranged to not perform the same configuration procedure when initializing the second power transfer as when initializing the first power transfer. The power receiver may be arranged to not perform the same configuration procedure when initializing a power transfer power using stored parameters values as when stored parameter values are not used. In some embodiments, a reduced configuration process may be performed when the second power transfer is initialized. The reduced configuration process may be a subset of the configuration process performed for the first power transfer, and specifically may omit determination of at least one parameter value.

In accordance with an optional feature of the invention, the power receiver further comprises: a first detector for detecting an absence of the power transfer signal during the first power transfer; a second detector for detecting a presence of the power transfer signal following a detection of the absence of the power transfer signal; and wherein the power transmitter controller is arranged to detect the termination of the first power transfer in response to the detection of the absence of the power transfer signal and to initialize the second power transfer in response to the detection of the presence of the power transfer signal.

In accordance with an optional feature of the invention, the communicator is arranged to transmit an identity indication for the power receiver to the power transfer signal in response to a detection of a return of the power transfer signal.

According to an aspect of the invention there is provided a method of operation for a power transmitter for a wireless power transfer system including a at least one power receiver for receiving a power transfer from the power transmitter via a wireless inductive power transfer signal; the power transmitter comprising a communicator for communicating messages with power receivers; and the method comprises: performing a configuration phase during power transfer initialization of a first power transfer with a first power receiver, including performing a configuration process during the configuration phase to determine a set of power transfer parameter values for the first power transfer in response to a communication with the first power receiver; storing the set of power transfer parameter values and a first identity indication for the first power receiver; performing the first power transfer during a power transfer phase using the set of power transfer parameter values; entering the power transmitter into a standby phase in response to a detection of an absence of the power receiver during the power transfer phase; a maximum power level for the power transfer signal during the standby phase being lower than a maximum power level for the power transfer signal during the power transfer phase; detecting a presence of a candidate power receiver during the standby phase; determining if a first duration from the detection of the absence of the first power receiver to the detection of the presence of the candidate power receiver exceeds a first threshold; determining if a candidate identity indication being an indication of an identity of the candidate power receiver matches the first identity indication; and initializing a second power transfer with the candidate power receiver using the set of stored parameter values subject to the duration being below the threshold and the candidate identity indication matching the first identity indication; and discarding the set of stored parameter values if the candidate identity indication does not match the first identity indication or if the duration since exceeds the threshold.

According to an aspect of the invention there is provided a method of operation for a power receiver for a wireless power transfer system including a power transmitter for providing a power transfer to the power receiver via a wireless inductive power transfer signal; the power receiver comprising a communicator for communicating messages with power transmitters; and the method comprising: extracting power from the power transfer signal during a power transfer phase; performing a configuration phase during power transfer initialization of a first power transfer with the power transmitter, including performing a configuration process during the configuration phase to determine a set of power transfer parameter values for the first power transfer in response to a communication with the power transmitter; detecting a termination of the first power transfer; and receiving power transfer parameter values from the power transmitter; and initializing a second power transfer using the received power transfer parameter values.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to a wireless power transfer system utilizing a power transfer approach such as known from the Qi specifications. However, it will be appreciated that the invention is not limited to this application but may be applied to many other wireless power transfer systems.

Figure 1:
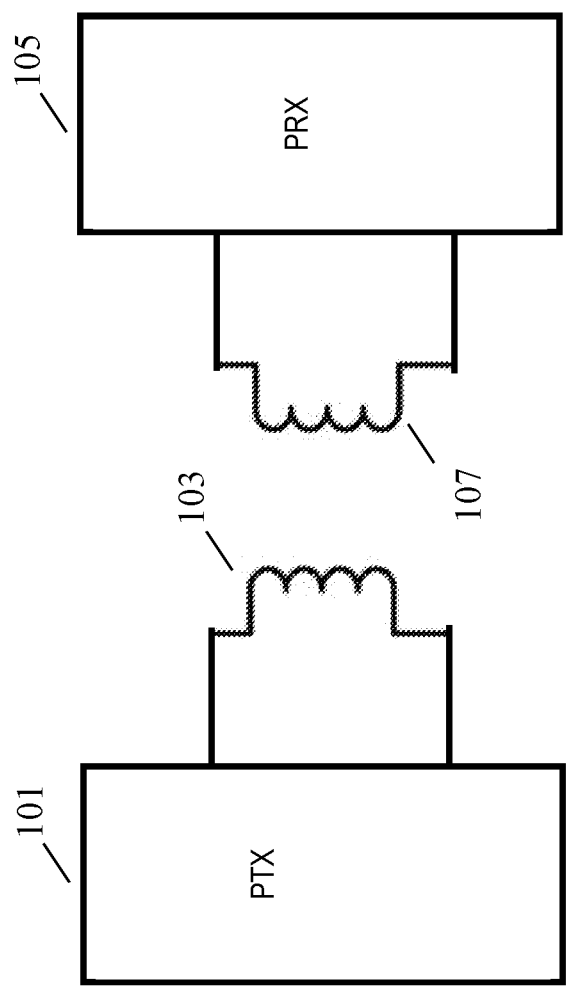
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiving device 105 which includes (or is coupled to) a receiver coil/inductor 107.

The system provides a wireless inductive power transfer from the power transmitter 101 to the power receiving device 105. Specifically, the power transmitter 101 generates a wireless inductive power transfer signal (also referred to as a power transfer signal, power transfer signal or an inductive power transfer signal), which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiving device 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiving device 105 is specifically a power receiver which receives power via a receive coil 107. However, in other embodiments, the power receiving device 105 may comprise a metallic element, such as a metallic heating element, in which case the power transfer signal induces eddy currents resulting in a direct heating of the element.

The system is arranged to transfer substantial power levels, and specifically the power transmitter may support power levels in excess of 500 mW, 1 W, 5 W, 50 W, 100 W or 500 W in many embodiments. For example, for Qi corresponding applications, the power transfers may typically be in the 1-5 W power range for low power applications, and in excess of 100 W and up to more than 1000 W for high power applications, such as e.g. kitchen applications.

In the following, the operation of the power transmitter 101 and the power receiving device 105 will be described with specific reference to an embodiment in accordance with the Qi Specification (except for the herein described (or consequential) modifications and enhancements) or suitable for the higher power kitchen specification being developed by the Wireless Power Consortium.

The approach may specifically be suitable for cordless power transfer to kitchen appliances in accordance with the approach of the specification for such provided by the Wireless Power Consortium. In accordance with this specification, when a cordless appliance (or other suitable power receiver) is placed on a power transmitter, a negotiation procedure is started to determine a power transfer contract. This contract depends on e.g. the expected power demand of the appliance and the capability of the power transmitter to deliver power.

In the protocol of the cordless kitchen specification, the power transmitter and power receiver negotiate a power transfer contract. This contract includes, e.g., the minimum amount of power that the power transmitter must guarantee to be able to provide to the power receiver. For example, the negotiation may establish that at least 1000 W must always be available for e.g. in order for the power to guarantee good heating of food in a pan.

During power transfer initialization, the power receiver and power transmitter accordingly performs a configuration phase where a number of parameters for the power transfer is determined, either as specific values, or e.g. as ranges or by upper or lower limits. The configuration is based on communication between the power receiver and the power transmitter and specifically includes a negotiation phase where parameter values are determined by negotiation between the power receiver and the power transmitter. The negotiation phase may for example be performed by the power receiver proposing parameter values/settings and the power transmitter accepting or rejecting these.

Typically, the configuration phase includes the power receiver and power transmitter performing a configuration process that includes a number of steps, including:
  The power transmitter detects and classifies the power receiver.
  The power transmitter retrieves a unique identifier (UID) from the power receiver.
  The power transmitter obtains configuration data from the power receiver.
  The power transmitter negotiates power transfer parameters, such as the minimum power level that the cordless power receiver can rely on having available during the power transfer.

Although the approach has a number of advantages and benefits and tends to allow efficient, flexible, and adapted wireless power transfer operation, it also tends to be relatively slow. In many cases, the approach may result in the initialization of a power transfer potentially taking several seconds.

In the following, an approach will be described which may provide an improved user experience for many practical applications. The approach is based on the Inventors' realization that whereas the current design approach based on a flexible and thorough power transfer initialization may provide advantageous performance in many scenarios, there exist other scenarios in which the approach and design principle leads to a less than ideal user experience. In particular, the Inventors have realized that it is not only desirable, but also possible, to modify the approach to allow for fast re-initializations of power transfer operations in many situations, and indeed that this can be achieved without sacrificing reliability, convenience, or safety.

The approach will be described with reference to FIG. 2 which illustrates exemplary elements of the power transmitter 101 of FIG. 2 and FIG. 3 which illustrates exemplary elements of the power receiver 105. In the example, the power transmitter 101 and the power receiver 105 are arranged to detect an interruption in an ongoing power transfer and to safely and securely restart/reinitialize the power transfer operation without performing a full initialization/configuration if this is feasible. Further, the system is arranged to differentiate between situations in which it is appropriate to restart the power transfer and situations in which a new power transfer should be initialized by going through the normal power transfer initialization phase.

The approach may provide a substantially improved user experience in many situations. For example, it may in particular for kitchen appliance embodiments provide additional flexibility and freedom to the user. For example, in a usage scenario, the user may want to remove an appliance from the power transmitter and quickly put it back, expecting that the power transfer continues directly after replacing the appliance. For example, the user may want to shake food in a pan to regulate the heat process to the food in the pan. While shaking, the user takes the pan briefly away from the power transmitter and returns it shortly after. Such a scenario is known to users from food preparation on a stove or (induction) cook top. The system of FIG. 1 enables a fast recovery of the power transfer e.g. following the removal and quick replacement of a cordless appliance on a power transmitter.

It further achieves this while ensuring that the power transfer is only quickly resumed when appropriate and without sacrificing safety. In particular, it may differentiate between the same power receiver being repositioned and another power receiver being positioned on the power transmitter. In many embodiments, it may further provide a targeted and adapted operation. For example, cordless appliances, e.g. a blender or alike, may not want the power transfer to restart automatically, and indeed it may be important in many embodiments that the fast restart operation is limited to appropriate situations.

Figure 2:
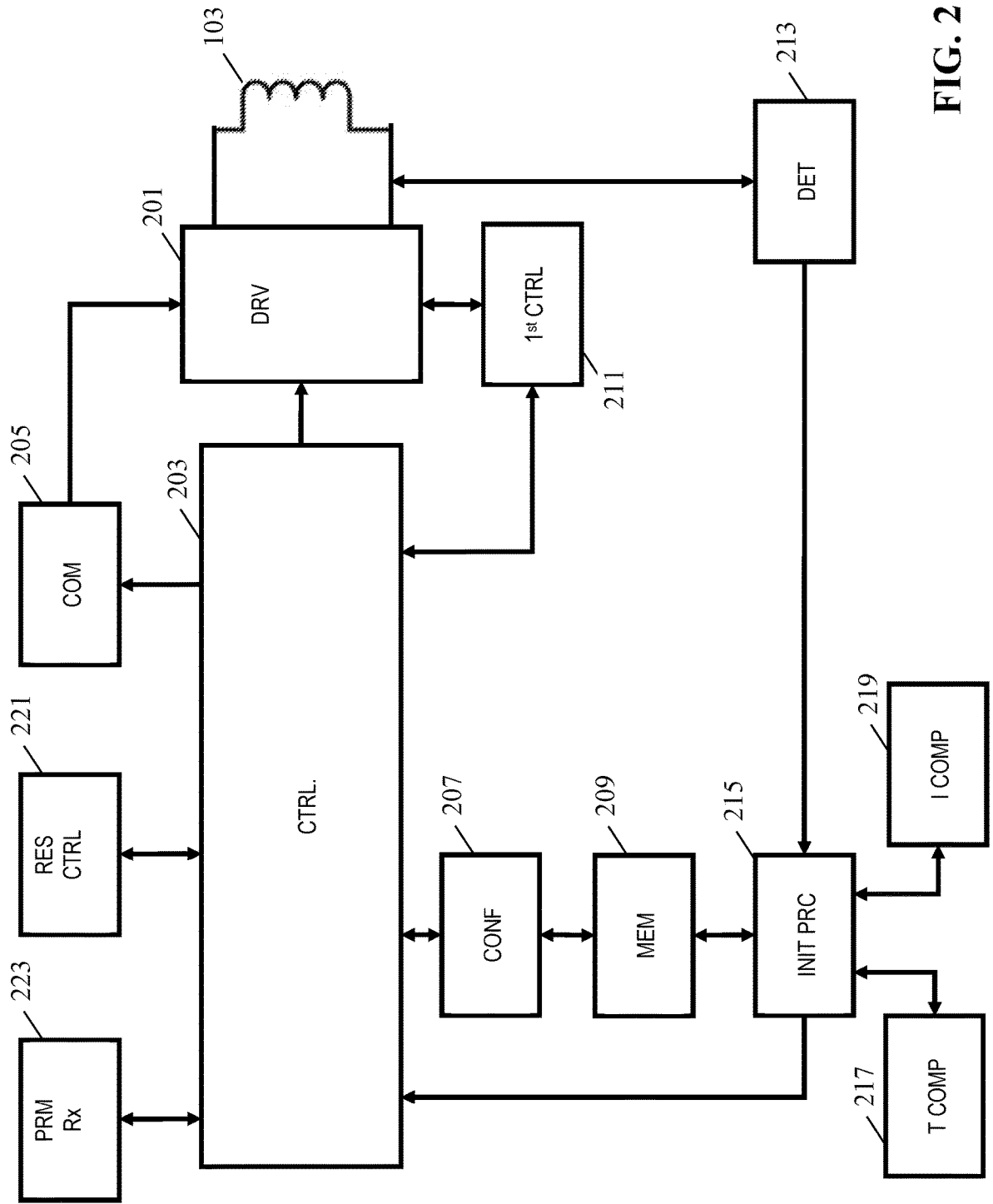
FIG. 2 illustrates an example of elements of a power transmitter in accordance with some embodiments of the invention.

FIG. 2 illustrates an example of elements of the power transmitter 101 of FIG. 1 in more detail. The transmitter coil 103 is coupled to a driver 201 which generates a drive signal for the transmitter coil 103. The driver 201 generates the current and voltage signal which is fed to the transmitter inductor 103. The driver 201 is typically a drive circuit in the form of an inverter which generates an alternating signal from a DC Voltage, or e.g. often from a rectified and smoothed AC Voltage. The output of the driver 201 is typically a switch bridge generating the drive signal by the appropriate switching of switches of the switch bridge.

The driver 201 is coupled to a power transmitter controller 203 which is arranged to control the operation of the power transmitter 101. The power transmitter controller 203 may be arranged to control the operation of the power transmitter 101 to perform the required and desired functions associated with power transfer protocols of the system, and may specifically in the present example be arranged to control the power transmitter 101 to operate in accordance with the Qi Specifications. For example, the power transmitter controller 203 may comprise functionality for detecting a power receiver, for performing appropriate functions for initiating power transfer, for supporting power transfer, for terminating power transfer etc.

The power transmitter controller 203 is specifically arranged to perform a power transfer operation during a power transfer phase. Thus, the power transmitter controller 203 may perform the usual power transfer operations during the power transfer phase such as implementing a power control loop based on messages from the power receiver 105 etc, as will be known to the skilled person.

The power transmitter 101 further comprises a communicator 205 which is arranged to communicate messages to and from the power receiver 105. The communicator 205 is specifically arranged to establish a two-way communication channel with the power receiver 105 thereby allowing messages to both be transmitted to, and received from, the power receiver 105. It will be appreciated that any suitable approach for communicating between the power transmitter 101 and the power receiver 105 may be used without detracting from the invention. For example, in some embodiments, the communicator 205 may be arranged to amplitude and/or frequency modulate the power transfer signal thereby allowing the power receiver 105 to receive data by demodulating this information. The power receiver 105 may be arranged to load modulate the power transfer signal and the communicator 205 may be arranged to detect such load modulation. In many embodiments, however, the communication is separate from the power transfer and the power transfer signal. In many embodiments, communication may be implemented using NFC communication techniques as will be known to the skilled person (and as used in the kitchen specification of the Wireless Power Consortium).

The power transmitter 101 further comprises a configurer 207 which during the configuration phase of the power transfer initialization is arranged to perform the configuration process in which it (using the communicator 205) communicates with the power receiver 105 to determine suitable parameter values for the subsequent power transfer. The configuration process may specifically follow the approach of the Wireless Power Consortium Specifications, and may be based on the power receiver sequentially requesting specific parameter settings with the power transmitter accepting or rejecting the proposed parameters.

The exact number and nature of parameters that are determined by the configuration process may be different in different embodiments and will depend on the preferences and requirements of the individual embodiment. In many embodiments, the configuration process may determine a minimum available power level that the power receiver is guaranteed to have available for extraction. Other parameters may include for example:

The maximum amount of power that the power receiver intends to consume.

The voltage level at which the power receiver intends to operate.

The inductance value of the power receiver's coil.

The frequency at which the power receiver desired the power transmitter to operate or start operating.

Calibration values for foreign object detection tests.

The configurer 207 is furthermore arranged to store a set of power transfer parameter values determined by the configuration process in a store/memory 209. In some embodiments, the configurer 207 may be arranged to store all the parameters that were determined as part of the configuration process, and indeed may further be able to store various operating parameters not determined by the configuration process. For example, in some embodiments, the power transmitter 101 may be arranged to store some operating parameter values during the power transfer phase, such as for example the current power level of the power transfer signal. In other embodiments, the configurer 207 may only store a subset of the parameter values determined during the configuration phase, potentially in addition to one or more other parameter values.

In addition, the power transmitter 101 is arranged to store an identity indication for the power receiver. The identity indication for the power receiver with which the configuration process is being performed, and thus the power receiver for which the power transfer is initialized, will be referred to as the first identity indication or simply as the first identity and the power receiver will be referred to as the first power receiver. It will be appreciated that any suitable indication of the identity of the first power receiver 105 may be used. In many embodiments, the identity indication may be an identification number transmitted from the first power receiver 105 to the power transmitter 101 (typically during the configuration process).

Thus, when the power transmitter 101 transitions into the power transfer phase and starts providing power to the first power receiver 105, the identity of the first power receiver 105 has been stored in the memory 209 together with a set of operating parameter values for the power transfer.

The configurer 207 further provides the determined parameter values to the power transmitter controller 203 which proceeds to perform the power transfer during the power transfer phase using the determined operation parameter values.

The power transmitter 101 further comprises a first controller 211 which is arranged to detect an absence of the first power receiver 105 during the power transfer phase; and to control the power transmitter 101 to enter a standby phase in response to this detection.

Thus, if the first controller 211 detects that the first power receiver 105 is no longer present, e.g. because it has been removed from the power transmitter by a user, it will control the power transmitter to transition from the power transfer phase into a standby phase in which the power transfer level is reduced. In most embodiments, the power transfer signal will be switched off completely in the standby phase, i.e. the power level may be reduced to zero. In some embodiments, however, the power transmitter 101 may still be arranged to provide a low-level power transfer signal to support e.g. detection of devices or provision of power to potential control circuitry of a power receiver potentially present. However, the maximum power level in the standby phase will be less than the maximum power level during the power transfer phase, and typically at least 10 times less. In most embodiments, the maximum power level of the power transfer signal is no more than 500 mW, 200 mW or 100 mW. This may further ensure that no excessive power dissipation, and thus heating, occurs of conductive foreign objects, such as keys, positioned proximal to the power transmitter 101.

In many embodiments, the standby phase may correspond to the power down phase, i.e. in response to a detection of the absence of the first power receiver 105, the power transmitter 101 may perform the same process/procedure as when the power transfer was terminated for any other reason.

It will be appreciated that different approaches for detecting the absence of the first power receiver 105 may be used in different embodiments. For example, in many embodiments, the first controller 211 is coupled to the driver 201 and may be arranged to determine the power level of the power transfer signal, i.e. it may be arranged to determine an estimate of the power being extracted by the first power receiver 105. If this suddenly drops below a given (low) level, the first controller 211 may use this as a detection that the first power receiver 105 is no longer present for power transfer. In other embodiments, the power transmitter 101 may comprise an explicit detector based e.g. on a small detection coil generating a dedicated high frequency magnetic test signal to detect whether any objects are present. In other embodiments, it may be practical and advantageous to e.g. use contact, weight, or optical sensors to determine whether an object corresponding to the power receiver remains in place over the transmit coil 103.

As yet another example, the first controller 211 may alternatively or additionally be arranged to detect that the first power receiver 105 is no longer present in response to a detection of missing communication from the first power receiver 105. For example, during a power transfer phase, the first power receiver 105 transmits power error control messages to the power transmitter, and it may be required that these are transmitted sufficiently frequently (e.g. for Qi systems it is required that a power control error message must be transmitted at least every 250 msec, 100 ms, or even 20 ms depending on the type of appliance and power level). If the power transmitter detects that these messages are no longer received, this may be considered an indication of the first power receiver 105 no longer being present.

The power transmitter 101 further comprises a detector 213 which is arranged to detect a presence of a candidate power receiver during the standby phase. Thus, the detector 213 may detect that a power receiver is brought into the vicinity of the power transmitter 101 and specifically that a power receiver is positioned such that it may potentially receive power from a power transfer. The candidate power receiver is (initially) unknown to the power transmitter 101 and may accordingly be the first power receiver 105 being returned or it may be a different power receiver.

It will again be appreciated that any suitable approach for detecting the candidate power receiver may be used. In particular, in many embodiments, the same approach as used by the first controller 211 may be used. For example, in many embodiments, a small intermittent electromagnetic detection signal may be generated, e.g. by the driver 201/transmit coil 103, or by a communication coil (e.g. using NFC communication circuitry), or using a dedicated test signal generator/coil. If the loading of such a detection signal suddenly increases, this may be an indication of a candidate power receiver being present.

In many embodiments, the detector 213 may be based on the communicator 205 detecting that a complementary communication entity is present. Specifically, NFC communication circuitry may be employed and if this detects the presence of another NFC communication unit, the detector 213 may use this as a detection of the potential presence of a candidate power receiver.

If such a candidate power receiver is detected it may thus be the same power receiver as the one supported in the previous power transfer (i.t. the first power receiver 105) or it may be a new power receiver for which a completely new power transfer should be setup. The power transmitter 101 of FIG. 2 comprises functionality for differentiating between such scenarios and specifically it is arranged to provide a faster restart of the power transfer if the new candidate power receiver is indeed the first power receiver 105, i.e. the power receiver of the previous power transfer. Thus, the system is arranged to detect that a candidate power receiver (being a candidate for a restart of the previous power transfer) is present and if the candidate power receiver is indeed the same, it may allow a fast restart of the previous power transfer and otherwise it may support a full initialization of a power transfer.

The power transmitter 101 accordingly comprises an initialization processor 215 which is arranged to control whether a fast initialization/restart of the previous power transfer is performed or whether a full initialization of a power transfer should be performed. The initialization processor 215 is coupled to two comparators 217, 219 and the decision on how to proceed is based on the results from these comparators 217, 219.

Specifically, the initialization processor 215 is coupled to a duration comparator 217 which is arranged to determine a first duration which is indicative of the time from the time of the detection of the absence of the first power receiver to the detection of the presence of the candidate power receiver. The duration is indicative of the time in which no power receiver has been present in accordance with the power transmitter's 101 detection algorithms. The duration comparator 217 may compare the duration to a given threshold to indicate whether this duration exceeds a given value or not, i.e. it may seek to determine whether the duration between the first power receiver being removed and the candidate power receiver being present exceeds a given value.

The threshold may in many embodiments be a fixed and/or predetermined threshold, such as simply being given by a certain number of seconds (often in the 10 to 100 second range). In other embodiments, it may be dynamically determined in response to one or more operating parameters, for example in may be increased for an increasing duration of the power transfer or may be reduced for an increasing power of the power transfer signal during the power transfer.

In some embodiments, the threshold may be retrieved from the power receiver, and thus it may also be subject to a change desired by the power receiver.

As an example, when the first controller 211 detects an absence of a power receiver, and thus detects that the first power receiver may have been removed, the duration comparator 217 is provided with an indication of this, and in response it may start a timer. When the detector 213 detects that a power receiver has returned, i.e. that a candidate power receiver is present, the duration comparator 217 may again be informed of this fact and it may determine the current value of the timer. If this is below the desired threshold, the duration comparator 217 indicates that the duration is below the given threshold and otherwise it indicates that it is above the threshold. Alternatively or equivalently, if the time reaches the threshold level, the duration comparator 217 may set a control flag indicating that the duration has been exceeded. Whenever a new power receiver is detected, this control flag may simple be evaluated to determine whether the duration exceeds the threshold or not.

As another example, the timer may be a down-counter that is initialized with the threshold, e.g. in seconds and counting down the seconds. If the counter reaches zero, the time is out, i.e. the threshold has been exceeded.

The initialization processor 215 is further coupled to an identity comparator 219 which is arranged to determine whether a candidate identity indication being an indication of the identity of the candidate power receiver matches the first identity indication, i.e. the identity stored for the first power receiver.

For example, during the setup of the first power transfer, the identity of the first power receiver 105 is stored in the memory 209. When a new candidate power receiver is detected, a process is started to retrieve the identity of this candidate power receiver. This candidate identity is then fed to the identity comparator 219 wherein it is compared to the stored identity. A control flag may be set to indicate whether a match is considered to have occurred or not.

The identity indications may be received in any suitable form. For example, typically the first identity indication is received or determined from the first power receiver 105 during the configuration process for the first power transfer. For example, an NFC anti-collision process may be performed allowing the power transmitter to identify the UID of the power receiver NFC communication functionality.

The candidate identity indication may be received in the same way, i.e. the parts of the configuration process that involve the retrieval of the identity of a power receiver may be performed in response to the detection of the presence of the candidate power receiver.

As a specific example, the communicator 205 may be based on NFC communication technology and in response to the communicator 205 generating an NFC carrier which is detected by NFC communication circuitry of a power receiver which in response transmits its identity. This identity is then fed to the identity comparator 219. Specifically, the communicator of the power transmitter may comprise an NFC reader which attempts to get a response from the power receiver (comprising NFC/RFID tag functionality) by sending the stored UID. If it receives a suitable response, the stored UID matches with the UID of the power receiver. Further details of NFC operation may be found in ISO/IEC 14443-3:2016 Part 3: Initialization and anticollision.

When the initialization processor 215 receives a notification that a new candidate power receiver has been detected, it interfaces with the duration comparator 217 and the identity comparator 219 to determine whether the comparison tests have been met or not.

If the comparisons indicate that indeed the duration is below the threshold and that the identity of the candidate power receiver is indeed the same as the first power receiver, then the initialization processor 215 determines that a fast initialization of the previous power transfer is feasible and appropriate. It accordingly proceeds to control the power transmitter 101 to initialize the power transfer operation but rather than going through full initialization phase, and specifically going through a full configuration phase, it retrieves the stored set of parameters and proceeds to use at least some of these parameters for the new power transfer.

For example, rather than engage in a negotiation phase with the candidate power receiver to determine the allowable power extraction level for the second power transfer, it simply adopts the stored value and uses this for the second power transfer. It will be appreciated that when performing a fast restart/initialization of the power transfer, the system may still go through a configuration phase, and especially go through a negation phase to determine one or more parameter values for the second power transfer. Thus, the operating parameter values for the second power transfer may be a mix of retrieved parameter values from the previous first power transfer and a number of newly determined parameters. For example, it may be practical to determine parameter values that may have changed during a new configuration process whereas parameters that are likely to be the same are not determined but instead the stored values are used. Examples of the former may include dynamically changed calibration values (e.g. depending on the specific position of the power receiver relative to the power transmitter) and examples of the latter may include e.g. the allowable power extraction limit or fixed calibration values (e.g. that do not depend on the relative position).

Thus, although some configuration and negotiation may be performed, this will be a reduced configuration and negotiation and accordingly may typically be much faster than a normal process. Accordingly, a very fast initialization of the second power transfer may be achieved and effectively this may be seen as a very fast restart of the previous power transfer, i.e. of the first power transfer.

It should be appreciated that although the fast initialization/restart of the second power transfer by using stored parameter values is subject to both the identity and the duration tests being met, it may in some embodiments be subject to other tests and requirements. In some embodiments, the second power transfer may for example only be initialized and started if the reduced configuration phase yields suitable parameters.

If the initialization processor 215 determines that either the duration test or the identity test do not match, it is considered that the stored parameter values are no longer valid and accordingly they are discarded so that they cannot be used for any future power transfer. The initialization processor 215 may for example discard the parameters by deleting them from the memory 209 or by setting a flag or other indication to indicate that the stored parameter values are no longer valid.

The initialization processor 215 will typically then proceed to control the power transmitter 101 to perform a full initialization of a power transfer with no use or consideration of the stored parameter values. Accordingly, a power transfer may be set up but this will not be based on any previous power transfer and will not use any stored parameter values. Accordingly, the power transfer initialization will tend to be relatively slow.

Figure 3:
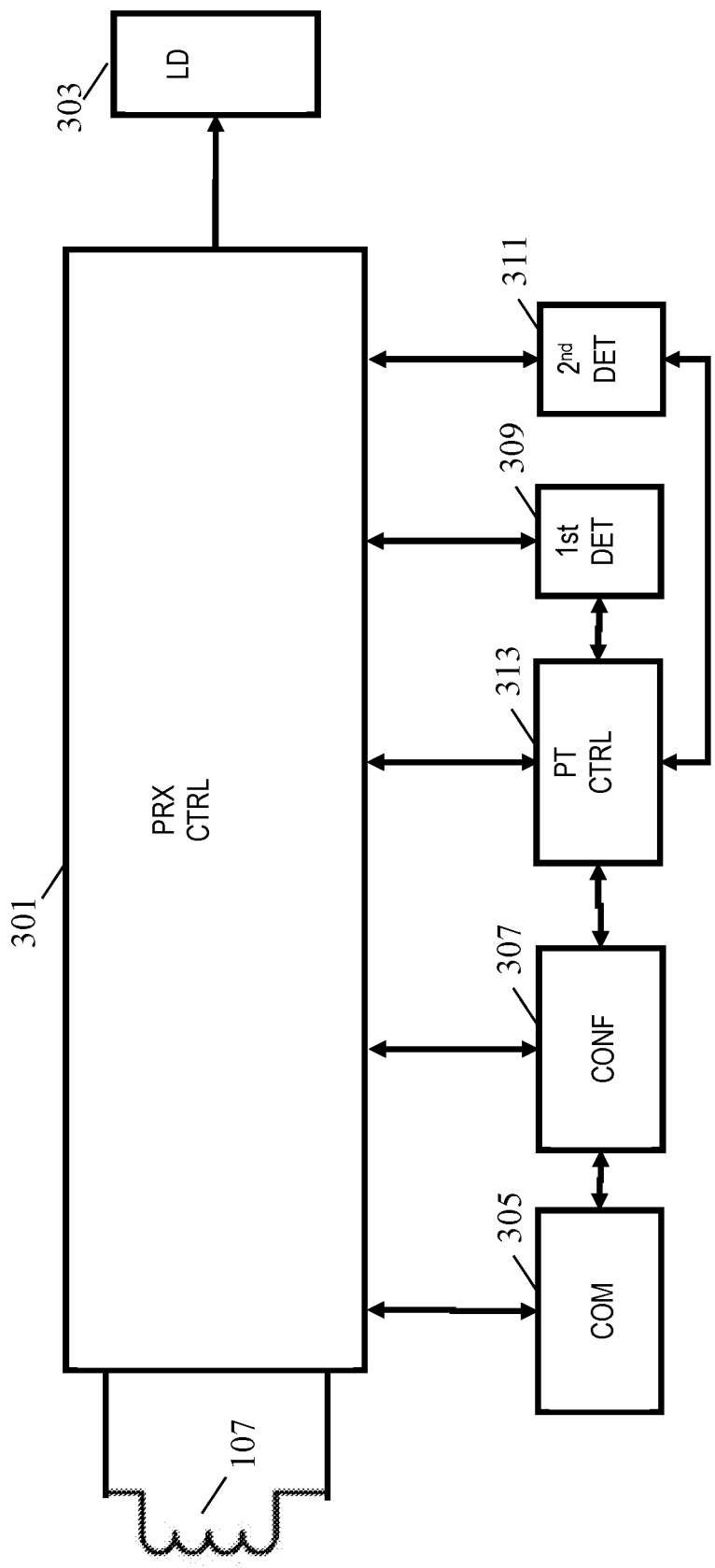
FIG. 3 illustrates an example of elements of a power receiver in accordance with some embodiments of the invention.

FIG. 3 illustrates an example of some elements of a power receiver which may support the described functionality, and specifically which may be able to support fast initialization of a power transfer in some circumstances. The power receiver may correspond to the first power receiver 105 of FIG. 1.

In the example, the receiver coil 107 is coupled to a power receiver controller or power extractor 301 which couples the receiver coil 107 to a load 303 and which is arranged to extract power from the power transfer signal during the power transfer phase. The power extractor 301 includes a power control path which converts the power extracted by the receiver coil 107 into a suitable supply for the load. In addition, the power extractor 301 may include various power receiver control functionality required to perform power transfer, and in particular functions required to perform power transfer in accordance with the Qi Specifications.

In order to support communication from the power receiver 105 to the power transmitter 101, the power receiver 105 comprises a receiver communicator 305. The receiver communicator 305 is arranged to communicate messages with power transmitters, and specifically with the power transmitter 101 in the example of FIG. 1.

The receiver communicator 305 is specifically arranged to establish a two-way communication channel with the power transmitter 101 thereby allowing messages to both be transmitted to and received from the power transmitter. It will be appreciated that any suitable approach for communicating between the power receiver 105 and the power transmitter 101 may be used without detracting from the invention. For example, in some embodiments, the receiver communicator 305 may be arranged to demodulate amplitude and/or frequency modulation of the power transfer signal. In some embodiments, it may be arranged to load modulate the power transfer signal. In many embodiments, however, the communication is separate from the power transfer and the power transfer signal. In many embodiments, communication may be implemented using NFC communication techniques as will be known to the skilled person (and as used in the kitchen specification of the WPC).

The power receiver 105 further comprises a power receiver configurer 307 which is arranged to perform the configuration process during the configuration phase. Specifically, it may be arranged to perform a configuration process that determines a number of operating parameter values for the subsequent power transfer. The power receiver configurer 307 may specifically be arranged to perform the power transfer initialization without any presumption of any previous power transfer or power transfer parameters being determined. In addition, it may, as will be described in the following, be able to support the setup of a power transfer based on operating parameter values that have been stored at the power transmitter 101.

The power receiver configurer 307 is arranged to perform the configuration process and to establish the operating parameter values based on a communication exchange with the power transmitter as previously mentioned.

The power receiver 105 further comprises a first detector 309 which is arranged to detect an absence of the power transfer signal during the first power transfer. The first detector 309 may for example be arranged to monitor the current through or voltage over a rectifier rectifying the signal induced in the power receiving coil 107. If this value falls below a given level (without the load being reduced), it is an indication of the power transfer signal not being present. Such a scenario may for example occur when the user moves the first power receiver 105 from the power transmitter 101, and thus the first detector 309 may often detect that the first power receiver 105 has been moved.

In response to the detection that the power transfer signal is no longer present, the power receiver may enter a standby mode of operation in which it will typically reduce the loading by the load 303 as the required power cannot be extracted from the power transfer signal. During the standby phase, the power receiver may be arranged to perform various suitable operations or monitor for specific events occurring.

In many embodiments, however, the power receiver will power down completely, as is typically the case with a kitchen appliance. In such a power down mode, the power receiver typically loses all its settings. For many power receivers, when the power returns, it has no knowledge whatsoever of any prior power transfer phase. In such a case, the power transmitter may transmit operating parameter values to the power receiver as will be described in more detail later.

Specifically, the power receiver 105 comprises a second detector 311 which is arranged to detect a presence of the power transmitter 101 following the detection of the absence of the power transfer signal. Thus, after the first detector 309 has detected that the power transfer signal is absent, it may enter a mode of operation in which it continues to monitor for the presence of a power transmitter 101. The mode is typically associated with no power being provided to any external load (or at least with reduced power).

The presence of a power transmitter may e.g. be detected by a detection that a power transfer signal is again present. This may be a power transfer signal having corresponding parameters to the power transfer signal of the previous power transfer or may e.g. be an intermittent power transfer signal which is generated to specifically indicate that a power transmitter is present and monitoring for power receivers.

In other embodiments, the detection may be based on other tests, such as a proximity detection (e.g. an optical test). In many embodiments, the detection may be based on the communication functionality, and specifically the receiver communicator 305 may detect that a communication suitable for load modulation is present, and this indication may be fed to the second detector 311 and used as an indication of the presence of a power transmitter. Specifically, the receiver communicator 305 may comprise an NFC communication unit which may detect that the communicator 205 of the power transmitter 101 generates an NFC carrier for an NFC device to load modulate. In other embodiments, the power receiver may base the detection on a detection of any other signal generated by the power transmitter to re-activate the power receiver.

The power receiver 105 further comprises a power transfer controller 313 which is arranged to control the initialization of power transfers. The power transfer controller 313 is arranged to initialize power transfer using an initialization process that includes a full configuration, and specifically negotiation, process and phase as previously described. Thus, in this case the power receiver 105 is arranged to communicate with the power transmitter 101 to perform a full configuration process in order to determine a full set of operating parameters for the subsequent power transfer.

However, in some scenarios, the power transfer controller 313 is arranged to initialize a power transfer without going through a complete, full configuration process but rather with no or a reduced configuration process. In this scenario, the power transfer is thus initialized with only a subset of the power transfer operating parameter values required or at least desired for the power transfer phase being determined based on a configuration process. Rather, a subset of the required power transfer operating parameter values is in this case assumed to be available from the previous power transfer.

The power transfer controller 313 may specifically be arranged to initialize a power transfer without performing a full configuration process if a duration from the detection of the absence of the power transfer signal to the detection of the presence of the power transmitter 101 does not exceed a threshold. Thus, if the power transfer controller 313 detects that the power transfer signal has disappeared during an ongoing power transfer but a power transmitter has returned within a given time interval/duration, then it controls the power receiver 105 to initialize the power transfer using a reduced initialization process wherein at least one power transfer parameter value is not determined by a configuration process but is assumed to be determined for a previous power transfer and to still be valid for the current power transfer.

The maximum duration for which the power transfer controller 313 will consider the prospect of performing a fast restart of the power transfer may depend on the preferences and requirements of the individual embodiment. The corresponding threshold may for example, be set as a predetermined value or e.g. be determined dynamically based on e.g. a duration of the previous power transfer or the power level of the power transfer. The threshold applied by the power receiver 105 may typically be the same as that applied by the power transmitter 101.

In some embodiments, one or more of the parameter values may during the previous power transfer be stored in a memory and the power transfer controller 313 may be arranged to retrieve the stored parameter values and to apply them to the current power transfer.

The power transmitter 101 and the power receiver 105 may thus be arranged to perform a reduced initialization of a power transfer in case certain conditions are met. This may in many scenarios result in a substantially reduced delay in starting a power transfer while still maintaining the flexibility, reliability and safety associated with a full configuration setup.

It will be appreciated that the power receiver 105 may be arranged to perform a reduced configuration process to determine some operating parameters even when performing a fast power transfer initialization. However, this configuration process will not be the same as that performed for a normal initialization, and specifically it will not include a determination of all the parameter values that may be determined during a normal initialization process.

It will also be appreciated that the standby modes/phases for the power receiver 105 and the power transmitter 101 need not be dedicated modes/phases applied in response to the detection of a power transfer being terminated unexpectedly, e.g. by the removal of the power receiver from the power transmitter. Rather, in many embodiments, the standby phase may directly correspond to the normal power down phase that the power transmitter and power receiver enter when a power transfer is terminated in an orderly fashion. Indeed, for many embodiments, a normal approach for terminating a power transfer is simply by the removal of the power receiver with the power transmitter and the power receiver then automatically entering their inactive/standby mode of operation where they wait for a new power transfer to be initialized.

However, in contrast to conventional approaches, the start-up and initialization of a new power transfer does not merely always proceed in the same way, but rather a differentiated approach is employed where a reduced initialization, and specifically a reduced configuration and negotiation, is performed with one or more operating parameters being setup from a previous power transfer. Thus, the initialization when a new power receiver is detected will be different for different power receivers and specifically a fast track power initialization is provided when the new power receiver is the previous power receiver and this is seeking to restart a previous power transfer operation within a given duration of this terminating. In this case, the power transfer is initialized using one or typically more power transfer parameter values of the previous power transfer parameter values with these having been stored during the previous power transfer. Thus, the system allows for a differentiated initialization which either may provide a full setup of a new power transfer or a fast initialization which in in many cases effectively corresponds to a fast restart of the previous power transfer.

Thus, as an example, in the power transfer phase, the power transmitter may provide power to a cordless appliance according to the demand of the appliance and the power transfer contract as prepared in the negotiation phase. If the appliance is removed from the power transmitter, the power transmitter may detect the missing appliance, e.g. due to a sudden load change or to missing communication. Directly after detecting this event, the power transmitter may store the operating power transfer settings (unless these have been stored before), remove the power signal and start a timer which expires at a given threshold. During the time that timer is not expired, the power transmitter allows a fast recovery of the power transfer.

The power transmitter may thus monitor its surface to detect a replacement of the appliance on the power transmitter. If it detects that an appliance is positioned appropriately, it can check if the appliance is the same as the appliance supported by the previous power transfer by checking if the identity (UID) is the same. For example, an NFC communicator may apply the stored UID and check if an expected response is received. The power transmitter may skip the NFC collision resolution procedure by directly addressing the appliance with the UID. If the UID matches the UID of the appliance, this will provide a response and the power transmitter may in response skip unnecessary parts of the configuration phase.

If the timer has not expired (and the UID matches), the power transmitter may further indicate to the power receiver that fast recovery is possible and negotiation can be skipped. In addition, in some cases, the power transmitter may provide the parameters of the power transfer contract and power transfer operating settings (as far as relevant for the power receiver) to the power receiver.

The duration in which the power transmitter will allow a fast power transfer initialization, i.e. the threshold used by duration comparator 217, may be determined differently in different embodiments. In many embodiments, it may be a fixed, predetermined threshold which e.g. may be permanently stored or built in during the manufacturing phase. In other embodiments, the timing value may e.g. be determined in response to a user input. For example, a user input may allow various settings of the power transmitter to be controlled by a user, and one of the settings may be of the time interval in which fast power recovery is available.

In some embodiments, the first power receiver may be able to transmit a time indication to the power transmitter and the duration comparator 217 may determine the threshold in response to the received time indication. Thus, the communicator 205 may receive a message comprising a time indication for the duration, and the power transmitter may set the threshold accordingly. In some embodiments, the duration comparator 217 may directly set the threshold to the value indicated by the received time indication, but in many embodiments the determination of the duration may include consideration of other parameters or requirements. For example, in many embodiments, the threshold may be set to correspond to received time indication but subject to an upper limit imposed by the power transmitter.

This may allow the power receiver to control the operation of the fast recovery initialization. It may for example allow a user interface controlling the operation to be provided on the power receiving device or appliance which may be preferable in many practical applications. Further, it may allow the operation to be adapted and customized to the specific power receiver. Thus, different types of appliances may be supported differently to match the specific typical usage case of the appliance.

In some embodiments, the system may further be arranged to enable or disable the function depending on the properties and capabilities of the power receiver.

Specifically, in many embodiments, the configurer 207 may be arranged to communicate with the first power receiver 105 to determine whether the first power receiver 105 supports initialization of power transfer operation based on stored power transfer parameter values. For example, during the configuration phase setting up the first power transfer, the first power receiver 105 may transmit a message to the power transmitter 101 indicating that it has capability for supporting the fast restart of a power transfer.

The initialization processor 215 may in such an embodiment be arranged to only initialize the power transfer operation with the candidate power receiver using the set of stored parameter values if the first power receiver has indicated that it does support initialization of power transfer operation based on stored power transfer parameter values. If the first power receiver 105 has not indicated that it supports the fast recovery process, then the initialization of a subsequent power transfer will not use the stored parameters but rather will use a full configuration process to determine all parameter values of the power transfer.

In the specific approach, the initialization processor 215 will only perform power transfer initialization based on stored parameter values if the first power receiver 105 has actively indicated that it supports this operation. If the first power receiver 105 has indicated that it does not support this functionality, it does not perform such an initialization. Similarly, if no indication has been provided to this effect, the initialization processor 215 will not either proceed with such an initialization but will always perform a full initialization, i.e. it will perform the same initialization regardless of whether the candidate power receiver is the same as the previous power receiver (i.e. the first power receiver) or whether it is a different power receiver. Such an approach may allow backwards compatibility with power receivers that have not been designed with the fast initialization functionality in mind.

In many embodiments, the communication of whether the power receiver supports fast recovery or not may be combined with an indication of the time in which fast recovery is supported. For example, a time indication of zero may indicate that fast recovery should never be supported for this power receiver.

As a specific example, a cordless appliance may indicate whether it desires support for fast recovery of a power transfer or not. It can do so by communicating corresponding data to the power transmitter during the configuration phase (specifically the connection/negotiation phase). This data can be represented by the maximum amount of time (T_absence_support) within which fast recovery of the power transfer is supported after removal of the cordless appliance (and subsequent replacement).

An appliance that does not need fast recovery support, or for which fast recovery may lead to an undesirable or even unsafe situation, communicates a T_absence_support of zero, meaning that the power transmitter shall not support fast recovery.

An appliance that needs fast recovery support communicates a T_absence_support greater than zero.

The support for fast recovery may further be subject to negotiation relating to whether the power transmitter supports the functionality at all, and how much absence time it is willing to bridge.

After successful negotiation of the power transfer contract and retrieval of a positive T_absence_support value, the power transmitter stores the UID of the appliance, the associated T_absence_support value and the power transfer contract for use in a potential subsequent fast power transfer recovery.

As previously described, the candidate power receiver may sometimes be arranged to transmit its identity (UID) to the power transmitter in response to a detection of the presence of a power transfer signal. For example, if the power receiver detects the presence of a power transfer signal it may proceed to load modulate this to communicate its identity.

In many embodiments, the candidate power receiver may however not explicitly communicate its identity prior to the determination of whether to perform fast recovery or not. In particular, in many embodiments, the power transmitter 101 may be arranged to transmit one or more messages to the candidate power receiver using the first identity indication, i.e. for the previous power receiver (the first power receiver). The messages may specifically be addressed to a receiver having an identity corresponding to the stored UID. The identity comparator 219 may then determine if the candidate identity indication matches the first identity indication, i.e. whether the identity of the candidate power receiver matches the identity of the first power receiver, based on whether the response expected if indeed the candidate power receiver is the first power receiver is received.

For example, the communicator 205 may transmit a message addressed to the stored UID. This message may specifically be a message that is transmitted to the candidate power receiver and addressing this with the stored UID. If an acknowledge message is received from the candidate power receiver, this is an indication that the candidate identity is the same as the first identity (i.e. the stored value).

It will be appreciated that the exact implementation of such an approach will depend on the specific details of the individual communication implementation.

As a specific example, for NFC communication, the communicator 205 may first provide a communication carrier that transitions the communicator 305 of the power receiver from the power-off state to the idle state. The communicator 205 may then proceed to provide commands (e.g. REQA and WUPA) to bring the communicator 305 from an idle state to a ready state. In the ready state, the communicator 205 normally performs an anti-collision loop to find out the UID of the communicator 305 (or the UIDs of multiple communicators). This process can take considerable time. To speed-up the NFC initialization, the communicator 205 may skip the anti-collision process and bring the communicator 305 from the ready to the active state by directly selecting it with the stored UID. Thus, rather than perform an anti-collision process, the communicator 205 may directly address the candidate power receiver using the stored UID. If indeed, the candidate power receiver is the first power receiver, it will have the same UID and accordingly respond correctly. If no appropriate response is received, this indicates that the candidate power receiver is not the first power receiver and accordingly the power transmitter may proceed with a full configuration.

In some embodiments, the power receiver may comprise functionality for storing power transfer parameter values, and accordingly when the absence of the power transfer signal is detected it may proceed to store such values. If the power receiver then during the following power transfer initialization receives an indication from the power transmitter that a fast recovery is being performed, it will proceed to retrieve and apply the stored power transfer parameter values.

In the above example, the power receiver comprises a specific first detector (309) for detecting an absence of the power transfer signal during the first power transfer. This detection leads the power transfer controller 313 determining that the first power transfer has ended and accordingly it enters the power receiver into a standby mode of operation in which it may e.g. typically reduce the loading by the load 303. Similarly, in the example, the power receiver comprises a second detector 311 which may detect that the power transmitter 101 has returned and in response it may initialize a new power transfer.

In the previously described approach this functionality may be powered control functionality, e.g. using a stored battery back-up. However, in other embodiments, explicit detections may not need to be performed in order to determine that the first power transfer has terminated or that a power transmitter is present. Rather, this may occur as part of an inherent reaction of the power receiver to the power transfer signal disappearing or the power receiver being moved.

In particular, in some embodiments, the power receiver may not comprise any functionality that operates in the absence of a power transfer signal. In such cases, the removal of a power receiver from a power transmitter may simply result in all functionality of the power receiver automatically switching off by not being powered. When the power receiver is brought near the power transmitter again, it will wake up e.g. in response to a power transfer signal being present or e.g. due to a NFC carrier being present. This will result in the power receiver starting to initialize a new power transfer.

Thus, inherently, a power receiver waking up also indicates that the previous power transfer has been terminated (and thus if the power receiver wakes up after the first power transfer, this indicates that indeed the first power transfer was terminated), i.e. the detection of a previous power transfer terminating is inherently indicated by the power receiver being in the wake-up/initialization phase as it would not be in this phase unless the previous power transfer was terminated.

In some embodiments, the power transmitter may explicitly send a message which indicates to the power receiver that the first power transfer has terminated. This may be a dedicated message transmitted for that purpose or may e.g. be a message that would only be transmitted if a previous power transfer was terminated unexpectedly. For example, during an initialization phase, the power transmitter may detect that it is still able to potentially resume a previous power transfer. In that case, the power transmitter may transmit a message to the power receiver which indicates that this is the case. The power receiver may interpret such a message as indicating that the previous power transfer was terminated but could potentially be resumed and the power receiver will proceed to communicate with the power transmitter to determine whether this is indeed appropriate.

In accordance with the approach, the power receiver may proceed to perform different operations depending on whether the first power transfer can effectively be restarted (whether a reduced configuration phase can be performed) or whether a full initialization of a new power transfer is appropriate.

Although, as described previously, the power receiver may in some embodiments determine which approach is appropriate, it will in many embodiments rely on the power transmitter making this decision. Furthermore, whereas the power receiver may in some embodiments retrieve parameter values from a local (e.g. non-volatile) memory, it may additionally or alternatively be arranged to receive such parameter values from the power transmitter.

Specifically, the power receiver may, e.g. in response to a NFC carrier or a power transfer signal being provided to power the power receiver, wake up and begin to potentially start a new power transfer. The power receiver will seek to determine whether this power transfer should be a full, new power transfer (e.g. whether a full configuration process is needed) or whether a reduced fast power transfer initialization based on the previous power transfer can be performed.

In the latter case, the communicator 305 may receive power transfer parameter values from the power transmitter 101 and the power transfer controller 313 may then initialize the second power transfer using the received power transfer parameter values. In this approach, the power receiver 105 accordingly does not need to store any parameters and indeed does not need to store any information on the previous power transfer.

In many embodiments, the power receiver may when waking up transmit a request message to the power transmitter 101 requesting this to indicate whether a full or reduced power transfer initialization should be performed. The power transmitter may transmit a response and if indeed a reduced power transfer initialization is to be performed, it may transmit a message comprising stored power transfer operating parameters that should be used by the power receiver 105. The power receiver 105 then proceeds to utilize the received values and skips the part of the configuration process that would otherwise determine these parameter values.

In many embodiments, the same request message from the power receiver 105 may request both the power transfer parameter values and information of whether reduced or full initialization should be performed. The power transmitter 101 may similarly use a single message format where a dedicated parameter value indicates that full initialization should be performed (e.g. a zero-power level).

Thus, in some embodiments, instead of relying on its own facilities (signal disappearance, timer, threshold) for which it needs to be powered, the power receiver may rely on information it receives from the power transmitter. When the power transmitter communicates stored configuration parameters to the power receiver, the power receiver can use this as an indication that a fast configuration and negotiation is possible and can use these parameters to perform such fast configuration and negotiation.

Indeed, often, the power receiver has no knowledge of a prior power transfer. To start the reduced initialization process, the power receiver may rely on a message from the power transmitter providing such information (e.g. it may poll the power transmitter whether reduced initialization is possible). The power transmitter will indicate so if the appropriate conditions are met (such as the identity of the power receiver matching the stored identity and the time window for fast power transfer initialization is still open).

In many embodiments, the power transmitter 101 may accordingly be arranged to transmit indications of at least one parameter value of the set of stored parameter values to the candidate power receiver when initializing the power transfer phase with the candidate power receiver. Thus, in some embodiments, the power transmitter 101 may provide information to the power receiver of what the stored parameter values are. The candidate power receiver may then proceed to apply the received power transfer parameter values during the subsequent power transfer phase.

In many embodiments, the power transmitter 101 may transmit all stored parameter values that are relevant to the power receiver. For example, it may transmit a value for the allowable power extraction and the power receiver may proceed to setup the power transfer to limit the power extraction to this value.

A particular advantage of this approach is that the power receiver does not need to comprise functionality for storing the power transfer parameter values, and in particular do not need to have functionality, such as non-volatile memory, for storing parameter values during times when the power receiver is not powered.

The transmission of the parameter values to the power receiver may for example be done by the power transmitter in response to a request for such parameters being received from the power receiver. For example, the power receiver may have lost the power transfer settings during its absence from the power transmitter. Accordingly, it may enter the connected phase as if it would be positioned on the power transmitter for the first time, and accordingly it may start the power transfer negotiation with a request to the power transmitter to indicate whether stored parameters are available and whether a fast recovery is feasible. Thus, the power receiver may send a request message to check if there is a valid power transfer contract in place. If so, the power transmitter may acknowledge this and proceed to transmit relevant parameters.

In different embodiments, different approaches may be taken to set the initial power level of the power transfer signal when initializing the power transfer based on stored parameters.

In some embodiments, the power transfer may be initialized with the power level of the power transfer signal set to a level that is determined based on the stored parameter values, i.e. it may be set to a level that is determined from the previous power transfer.

Specifically, in many embodiments, the power transfer signal may be set to a power level that corresponds directly to the previous power level. In other situations, it may be set to e.g. a reduced power level, such as e.g. 6 dB or 3 dB below the previous power level.

Such an approach may in many situations allow a very quick adaptation to the appropriate power level and may allow a fast restart of the power transfer and a quick return to the previously prevailing conditions.

In other embodiments, the power transmitter may be arranged to initialize the fast recovery power transfer with a power level of the power transfer signal being set to a nominal level which is independent of the stored set of power transfer parameter values. Thus, in some embodiments, the power level is not determined by the stored values, or the conditions during the previous power transfer, but rather the power transfer is initialized at a nominal level.

The nominal level may in some embodiments be a predetermined value or may in some embodiments be dynamically determined.

In such an approach, the power transfer signal can thus be ensured to be at an initial safe level but at the expense of an increased delay for the system to adapt the power level to the appropriate level (e.g. by the power receiver transmitting power control messages). The approach may be particularly suitable for situations where the conditions may have changed substantially between the initial and the fast recovery power transfers. For example, if the power receiver is an appliance that may have been removed and put back on the power transmitter, it is likely that the exact positioning has changed and this may result in a substantially different coupling between the transmitter coil 103 and the receive coil 107. Accordingly, using the previous power level setting may result in a signal that is too high which may be more disadvantageous than starting with a nominal level that may potentially be too low.

In some embodiments, the power transmitter may even be arranged to select between providing initial power at a nominal level or at a level based on the previous power transfer. For example, the power receiver may request the power transmitter to directly apply the previously used power transfer operating parameters, or to restart the power transfer from an initial setting and then quickly control the power transmitter to a desired operating point, which can be equal to or different from the original operating situation.

In some embodiments, the initialization processor 215 may be arranged to limit a power level of the power transfer signal until a power-on request is received from the candidate power receiver. In particular, the power level may be reduced to substantially zero until a request for the power to be increased is received from the power receiver, i.e. the power transfer signal is not switched on until requested by the power receiver. This may for example be implemented by the power receiver transmitting a specific dedicated message requesting that the power transfer signal is switched on and the power transfer is started. In response, the power transmitter may switch on the power transfer signal. The approach may allow the power receiver to control when power is actually provided and thus may allow the power receiver to ensure that this occurs at an appropriate time.

In some embodiments, the power transmitter 101 may share a resource with a plurality of other power transmitters. For example, a plurality of power transmitters may be powered from the same shared power source. This power source may be limited and may not be sufficient to support all power transmitters simultaneously operating at peak load. For example, a set of, say, 5 power transmitters may each be arranged to provide up to 1 kW power but may be fed by a common power source which has a maximum power provision of 2 kW.

In such a case, each power transmitter may be allocated a share of the available power and thus may be controlled such that the total amount of power does not exceed the available amount of power. Thus, when a power transmitter is initializing a power transfer, it requests an amount of the shared resource, such as power level. If this is available, it is allocated to the power transmitter for the duration of the power transfer. When the power transfer finishes in an orderly fashion, the reserved resource is released again such that it can be utilized by other power transmitters.

Accordingly, the power transmitter may comprise a resource controller which is arranged to reserve a resource for the first power transfer from a shared resource where the resource is shared between a plurality of power transfers. However, rather than release the resource immediately when the power transfer ends, and when the absence of the first power receiver is detected, the resource controller is arranged to retain the reserved resource until the duration exceeds a given threshold. The threshold may specifically be the same as the first threshold used to determine whether fast recovery may be performed i.e. the resource remains reserved to the power transmitter 101 until a time when a fast recovery of the power transfer is no longer supported. However, in other embodiments, the threshold may be set differently and typically to longer durations as this may advantageously reserve resource even if a full power transfer initialization needs to be performed.

Hence, in some embodiments, the power transmitter may keep the resources necessary to fulfil the power transfer contract of the previous power transfer for a given time, and specifically for a time corresponding to the interval until the timer has not expired. As a consequence, if another power transmitter sharing the same limited power resource tries to claim more power from the shared power source for negotiating a power transfer contract with another appliance, (and as a result would jeopardize the existing power transfer contract), the system/shared resource denies the other power transmitter's request for power. Thus, in the situation where the power transmitter shares a limited power source with another power transmitter, the available power for this other power transmitter may be reduced during the fast recovery interval as the resource is still reserved.

In the previous example, the power transmitter supports a fast recovery of a power transfer that was previously performed between the power transmitter and a power receiver. However, in some embodiments, the power transmitter may be arranged to support the fast recovery of a power transfer that was performed with another power transmitter.

In particular, in some embodiments, the power transmitter 101 may comprise a receiver 223 which may receive a time indication, a second set of power transfer parameter values, and a second identity indication for a second power receiver. The time indication, the second set of power transfer parameter values, and the second identity indication may specifically correspond directly to the previously described time indication, set of power transfer parameter values, and identity indication but with the difference that they have not been locally determined from a previous power transfer of the power transmitter but rather have been received from another source.

Typically, this other source may be another power transmitter. For example, a power transfer may previously have been supported by another power transmitter and the power receiver may have been removed from this power transmitter. In response, this other power receiver may have communicated the time indication, set of power transfer parameter values, and identity indication to the current power transmitter.

The initialization processor 215 may then be arranged to initialize a power transfer operation with the candidate power receiver using these received values. Indeed, the previously described approach may be used substantially directly but with the difference than the received data rather than the locally generated data is used.

It will be appreciated that in many embodiments, the power transmitter 101 may further comprise functionality for transmitting the time indication, set of power transfer parameter values and identity indication locally generated for the power transfer with the first power receiver to other power transmitters.

As an example, multiple power transmitters may in this way support power delivery to the same appliance. If the appliance is moved from transmitter 1 to transmitter 2 without the timer expiring, transmitter 1 removes the power signal and transmitter 2 quickly starts up power transfer. In order to do this, power transmitter 1 and 2 share at least the UID and T_absence_support value for this appliance.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:
1. A wireless power receiver comprising:
a communicator circuit, wherein the communicator circuit is arranged to communicate with a wireless power transmitter;
a power extractor circuit, wherein the power extractor circuit is arranged to extract power from a wireless power transfer signal during a power transfer phase;
a configuration circuit; and
wherein the configuration circuit is arranged to perform a configuration process during a first configuration phase for power transfer initialization of a first power transfer with the wireless power transmitter,
wherein the first power transfer occurs during a first power transfer phase,
wherein the configuration circuit is arranged to perform the configuration process during the first configuration phase to determine a first set of configuration parameters for the first power transfer in communication with the wireless power transmitter;
a power transfer controller circuit, wherein the power transfer controller circuit is arranged detect a termination of the first power transfer,
wherein the communicator circuit is arranged to receive, following completion of the first power transfer phase, a second set of configuration parameters during a second configuration phase with the wireless power transmitter,
wherein the second set of configuration parameters comprises a subset of the first set of power transfer parameters; and
wherein the power transfer controller circuit is arranged to initialize a second power transfer using the second set of configuration parameters to bypass at least a portion of the configuration process.

2. The wireless power receiver of claim 1, further comprising:
a first detector circuit, wherein the first detector circuit is arranged to detect an absence of the power transfer signal during the first power transfer phase;
a second detector circuit, wherein the second detector circuit is arranged to detect a presence of the power transfer signal following a detection of the absence of the power transfer signal,
wherein a power transmitter controller circuit is arranged to detect the termination of the first power transfer in response to the detection of the absence of the power transfer signal,
wherein the power transmitter controller circuit is arranged to initialize the second power transfer in response to the detection of the presence of the power transfer signal.

3. The wireless power receiver of claim 2, wherein the wireless power receiver is arranged to receive indications of at least one parameter value of the first set of power transfer parameters when initializing the second power transfer phase.

4. The wireless power receiver of claim 1,
wherein the communicator circuit is arranged to transmit an identity to the wireless power transmitter in response to a detection of a return of the power transfer signal,
wherein the identity is associated with the wireless power receiver.

5. The wireless power receiver of claim 1, wherein the communicator circuit is arranged to receive a time indication from the wireless power transmitter.

6. The wireless power receiver of claim 1,
wherein the wireless power receiver is arranged to transmit at least one message to the wireless power transmitter,
wherein the at least one message comprises a first identity,
wherein wireless power receiver is arranged to receive response message from the wireless power transmitter.

7. The wireless power receiver of claim 1,
wherein the communicator circuit is arranged to receive a power transfer termination from the wireless power transmitter,
wherein the power transfer termination indicates that the first power transfer phase has terminated.

8. The wireless power receiver of claim 1,
wherein the second power transfer phase is initialized with a power level of the power transfer signal associated with the first power transfer phase,
wherein the power transfer signal is determined in response to at least one parameter value of the first set of power transfer parameters.

9. The wireless power receiver of claim 1, wherein the second power transfer phase is initialized with a power level of the power transfer signal at a nominal level independent of the first set of power transfer parameters.

10. The wireless power receiver of claim 1, wherein the second configuration phase is a reduced configuration phase relative to the first configuration phase,
wherein the configuration circuit is arranged to determine a time duration corresponding to termination of the first power transfer phase and an initiation of the second power transfer phase, and
wherein the communication circuit is configured to transmit a request for a reduced configuration phase to the wireless power transmitter if the time duration is less than a threshold value.

11. The wireless power receiver of claim 1, wherein the communication circuit is configured to receive a message from the wireless power transmitter indicating that the wireless power transmitter may resume a previous wireless power transfer phase, and
wherein the communication circuit is configured to send a response message indicating whether the wireless power receiver may proceed with a subset of the first set of configuration parameters.

12. A method of configuring a wireless power receiver for wireless power transfer, the method comprising:
extracting power from a power transfer signal during a power transfer phase;
performing a first configuration phase during power transfer initialization of a first power transfer with a wireless power transmitter,
wherein the first configuration phase comprises a configuration process to determine a first set of power transfer parameters for the first power transfer in communication with the wireless power transmitter;
detecting a termination of the first power transfer;
receiving a second set of configuration parameters during a second configuration phase with the wireless power transmitter,
wherein the second set of configuration parameters comprise a subset of the first set of power transfer parameters from the wireless power transmitter; and
initializing a second power transfer using of the second set of configuration parameters to bypass at least a portion of the configuration process.

13. The method of claim 12, further comprising:
detecting an absence of the power transfer signal during the first power transfer;
detecting a presence of the power transfer signal after a detection of the absence of the power transfer signal;

detecting the termination of the first power transfer in response to the detection of the absence of the power transfer signal; and initializing the second power transfer in response to the detection of the presence of the power transfer signal.

14. The method of claim 12, further comprising transmitting an identity of the wireless power receiver to the wireless power transmitter in response to a detection of a return of the power transfer signal.

15. The method of claim 12, further comprising, receiving the second power transfer only if the wireless power receiver indicates that it supports initialization of power transfer based on the second set of parameters.

16. The method of claim 12, further comprising, receiving indications of at least one parameter value of the first set of parameters during initialization of the second power transfer.

17. The method of claim 12, further comprising, receiving a power transfer termination message from the wireless power transmitter, wherein the power transfer termination message indicates that the first power transfer has terminated.

18. The method of claim 12, further comprising, wherein the power transfer signal is determined in response to at least one parameter value of the first set of power transfer parameters, and wherein the first set of power transfer parameters are stored in memory of the wireless power transmitter.

19. The method of claim 12, further comprising, wherein a power level of the power transfer signal during the second power transfer is at a nominal level independent of the set of power transfer parameters.

20. The method of claim 12, further comprising determining a time duration corresponding to termination of the first power transfer phase and an initiation of the second power transfer phase; and transmitting a request for a reduced configuration phase to the wireless power transmitter if the time duration is less than a threshold value, wherein the second configuration phase is a reduced configuration phase relative to the first configuration phase.

* * * * *